United States Patent
Sayeedi

(10) Patent No.: US 7,551,613 B2
(45) Date of Patent: Jun. 23, 2009

(54) METHOD OF SUPPORTING REACTIVATION OF A DORMANT SESSION USING STORED SERVICE CONFIGURATIONS

(75) Inventor: Shahab M. Sayeedi, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 924 days.

(21) Appl. No.: 10/656,391

(22) Filed: Sep. 5, 2003

(65) Prior Publication Data

US 2004/0062227 A1 Apr. 1, 2004

Related U.S. Application Data

(60) Provisional application No. 60/408,576, filed on Sep. 6, 2002.

(51) Int. Cl.
 H04J 3/06 (2006.01)
 H04W 4/00 (2006.01)
 H04W 36/00 (2006.01)

(52) U.S. Cl. .................. 370/389; 370/329; 370/331; 370/350; 455/436

(58) Field of Classification Search ......... 370/310–350, 370/389–458; 455/426–450, 445–474, 509–519; 709/203–236
See application file for complete search history.

(56) References Cited

U.S. PATENT DOCUMENTS

| | | | | |
|---|---|---|---|---|
| 6,725,053 B2* | 4/2004 | Rosen et al. | ................. | 455/518 |
| 6,738,617 B2* | 5/2004 | Rosen et al. | ................. | 455/418 |
| 6,768,726 B2* | 7/2004 | Dorenbosch et al. | ........ | 370/331 |
| 6,904,288 B2* | 6/2005 | Rosen et al. | ................. | 455/518 |
| 6,912,214 B2* | 6/2005 | Madour et al. | .............. | 370/340 |
| 6,912,401 B2* | 6/2005 | Rosen et al. | ................. | 455/518 |
| 6,950,657 B1* | 9/2005 | Hiller et al. | ................. | 455/445 |
| 6,952,411 B2* | 10/2005 | Sinnarajah et al. | .......... | 370/335 |
| 6,959,190 B2* | 10/2005 | Choi et al. | .................... | 455/442 |
| 6,963,550 B2* | 11/2005 | Choi et al. | .................... | 370/331 |
| 7,065,062 B2* | 6/2006 | Madour et al. | .............. | 370/331 |
| 7,133,674 B2* | 11/2006 | Rajkotia et al. | ............. | 455/436 |
| 7,154,903 B2* | 12/2006 | Sivalingham | ............... | 370/429 |
| 7,180,879 B2* | 2/2007 | Sinnarajah et al. | .......... | 370/335 |
| 7,227,848 B2* | 6/2007 | Sayeedi et al. | .............. | 370/328 |
| 7,283,495 B2* | 10/2007 | Lee et al. | ..................... | 370/331 |
| 7,298,701 B2* | 11/2007 | Hsu et al. | ..................... | 370/235 |
| 7,301,922 B1* | 11/2007 | Bhalla et al. | ................. | 370/331 |
| 7,379,440 B2* | 5/2008 | Gopal | ......................... | 370/335 |
| 2003/0053431 A1* | 3/2003 | Madour | ....................... | 370/331 |
| 2003/0143989 A1* | 7/2003 | Ho et al. | ..................... | 455/418 |
| 2003/0157945 A1* | 8/2003 | Chen et al. | ................... | 455/458 |
| 2003/0193911 A1* | 10/2003 | Zhao et al. | ................... | 370/331 |
| 2004/0008645 A1* | 1/2004 | Janevski et al. | ............. | 370/331 |
| 2004/0109423 A1* | 6/2004 | Sayeedi et al. | .............. | 370/328 |
| 2004/0203780 A1* | 10/2004 | Julka et al. | ................... | 455/436 |
| 2005/0036463 A1* | 2/2005 | Nesargi et al. | .............. | 370/335 |
| 2005/0117521 A1* | 6/2005 | Abrol et al. | .................. | 370/252 |
| 2005/0130707 A1* | 6/2005 | Ho et al. | ...................... | 455/561 |
| 2005/0130708 A1* | 6/2005 | Ho et al. | ...................... | 455/561 |
| 2005/0195787 A1* | 9/2005 | Madour et al. | .............. | 370/338 |

* cited by examiner

*Primary Examiner*—Man Phan

(57) ABSTRACT

A method of supporting reactivation of service instances in a dormant session. A wireless device (102) sends an Origination or Reconnect message to a Base Station (104) requesting reactivation of one, all or some of its dormant service instances. The request includes a SYNC_ID previously assigned by the BS. The Base Station sends a message to a Packet Control Function (106) requesting stored service configuration information. The Packet Control Function responds with the requested information and channel resources are allocated for each service instance supported for the session.

7 Claims, 2 Drawing Sheets

US 7,551,613 B2

METHOD OF SUPPORTING REACTIVATION OF A DORMANT SESSION USING STORED SERVICE CONFIGURATIONS

REFERENCE(S) TO RELATED APPLICATION(S)

The present application claims priority from provisional application, Ser. No. 60/408,576, entitled "APPARATUS AND METHOD OF SUPPORTING REACTIVATION OF A DORMANT SESSION HAVING MULTIPLE SERVICE INSTANCES," filed Sep. 6, 2002, which is commonly owned and incorporated herein by reference in its entirety.

FIELD OF THE INVENTION

The invention relates to the field of communication systems, and more particularly, to a Code Division Multiple Access (CDMA) communications system.

BACKGROUND OF THE INVENTION

Data services are generally grouped into two categories: circuit-oriented (which includes Asynchronous Data and Group-3 Fax services) and packet. For calls that support packet data services, a Packet Data Serving Node (PDSN) serves as an interface between the transmission of data in a fixed network and the transmission of data over an air interface. The PDSN interfaces to a Base Station (BS) through a Packet Control Function (PCF), which may or may not be co-located with the BS.

As defined in the $3^{rd}$ Generation Partnership Project 2; 3GPP2 Access Network Interfaces Interoperability Specification (hereinafter referred to as 3GPP2 A.S0013-O v2.0), there are three packet data session states: Active/Connected, Dormant, and Null/Inactive. When a wireless device, such as a mobile station (MS), originates a packet data call to the current cdma2000 Radio Access Network (RAN), a traffic channel is allocated to establish a point-to-point protocol (PPP) connection and perform Mobile Internet Protocol (MIP) Registration procedures. Upon successful completion of these procedures, the MS's packet data service instance transitions from a Null to an Active/Connected state and the network and MS exchange packet data over a traffic channel. After a predefined period of inactivity, the MS's packet data service instance transitions from an Active to a Dormant state, however it may become Active again if the MS or network has data to send.

In the Active/Connected State, a physical traffic channel exists between a MS and a BS, and either unit may send data. In the Dormant State, no physical traffic channel exists between the MS and BS, but the PPP link between the MS and the PDSN is maintained. In the Null/Inactive State, there is no traffic channel between the MS and BS and there is no PPP link between the MS and the PDSN.

The air interface standard (IS-2000) includes changes to support fast call setups. Fast call setup enhancements are specified in S.R0065. The enhancements support faster dormant reactivations of packet data calls.

In one enhancement, the BS assigns a SYNC_ID corresponding to the MS's current service configuration and non-negotiable service configuration (hereinafter referred to as stored service configuration) and sends the SYNC_ID to the MS in the IS-2000 Service Connect message after a service configuration has been negotiated. The service configuration consists of the IS-2000 service configuration record and non-negotiable service configuration record. The content of these elements is specified in TIA-2000.5-C, sections 3.7.5.7 and 3.7.5.20, respectively. The MS may later include the SYNC_ID in an Origination, Enhanced Origination, Page Response, or Reconnect message when reactivating one or multiple dormant service instances supported by the MS's stored service configuration. The BS uses the SYNC_ID sent by the MS to retrieve the corresponding stored service configuration for the call. If the service configuration information associated with the SYNC_ID are available and can be supported by the BS, the BS sends a Channel Assignment or Service Connect message to the MS with the USE_OLD_SERV_CONFIG field set to indicate that the stored service configuration should be used (TIA-2000-A/B), or sends an extended channel assignment message (ECAM) to the MS with GRANTED_MODE set to 11 to indicate that the stored service configuration should be used (TIA-2000-C). The message instructs the MS to use the stored service configuration, thereby allowing the service negotiation procedure to be bypassed. The BS proceeds to reactivate the service instance specified by the SR_ID sent by the MS using the stored service configuration. This results in faster dormant packet data reactivations.

In another enhancement, the MS may initiate reactivation of all of its dormant service instances supported by the stored service configuration using a single air interface message. As in the previous case, the MS sends a previously assigned SYNC_ID to the BS in an Origination, Enhanced Origination, Page Response, or Reconnect message, but with the SR_ID field set to '111'. If the stored service configuration associated with the SYNC_ID is found, the BS sends a Channel Assignment or Service Connect message to the MS with the USE_OLD_SERV_CONFIG field set to indicate that the stored service configuration should be used (TIA-2000-A/B), or the BS sends an ECAM message with GRANTED_MODE set to 11 and the service negotiation procedure is bypassed. In this case, the BS proceeds to reactivate all of the MS's service instances associated with the stored service configuration.

In the current IOS specification, neither the BS nor the PCF maintains the MS's packet data service configuration information during dormancy. The BS maintains the information when the session is active. When a session goes dormant and the mobile requests a reactivation using a SYNC_ID, the BS cannot reactivate any service instances supported by the dormant session without knowing which SR_IDs, Service Options, and other service configuration information are associated with connection. Either the BS or PCF must be able to retrieve the MS's service configuration during dormancy.

Thus, there is a need for a method in the RAN for supporting reactivation of service instances in a dormant session using stored service configurations.

DETAILED DESCRIPTION OF THE PREFERRED EMBODIMENTS

In accordance with the present invention, the MS's packet data service configuration information is stored at the PCF before the packet data session goes dormant when fast call setup using a stored service configuration is supported. This provides several advantages over storing the information at the BS. First, fast call setup functionality using a stored service configuration can be preserved across multiple BSs within a PCF's packet zone, thereby allowing service negotiation to be bypassed for session re-activations following an intra-PCF handoff. Second, the network (RAN) is able to restore a unique service configuration for the MS when reactivating from dormancy without the need for additional service negotiation. Currently there are no standardized service configuration records that can be used across BSs in an intervendor environment. Third, the stored service configuration information can be flushed from the source PCF after the MS performs a handoff into a new packet zone using known procedures. In contrast, if dormancy information is maintained at the BS, the MS's session configuration information can remain at the BS indefinitely following a dormant mode handoff.

The preferred embodiment of the present invention provides a method for supporting reactivation of a dormant session using stored service configurations. In a first embodiment, the method includes receiving stored service configuration information from a packet control function; and reactivating the dormant packet data session in a radio access network using the stored service configuration information, thereby bypassing service negotiation. In a second embodiment, the method includes receiving a request for service configuration information from a base station, wherein the request comprises a SYNC_ID corresponding to the service configuration information; and sending the service configuration corresponding to the SYNC_ID to the base station.

Figure 1:
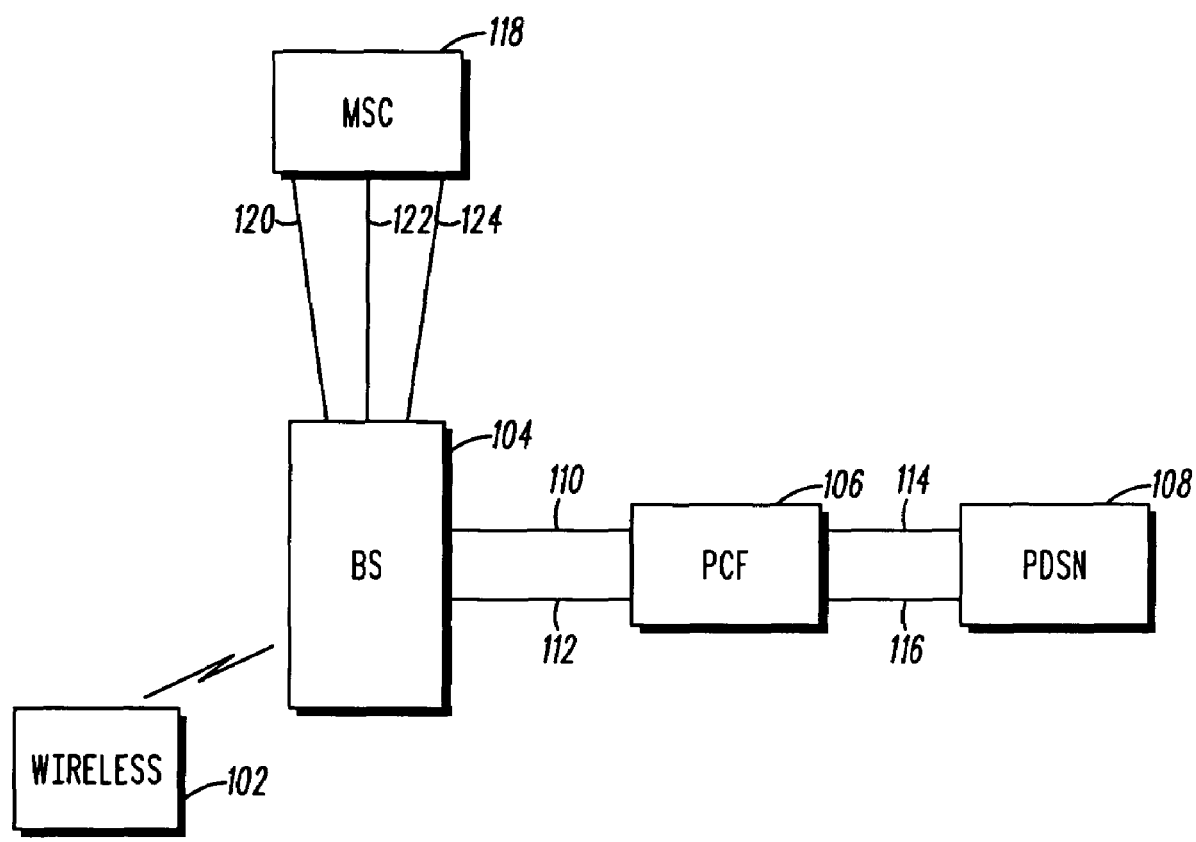
FIG. 1 is a block diagram showing the relationship among network components involved in the method of supporting reactivation of a dormant session using stored service configurations.

Turning now to FIG. 1, a block diagram showing the relationship among network components in support of the method of supporting reactivation of a dormant session using stored service configurations of the present invention is shown. A BS 104 is in communication with a PCF 106 through an A8 interface 110 and an A9 interface 112. The A8 interface provides a path for user traffic between the BS 104 and the PCF 106 for packet data services. The A9 interface 112 provides a signaling connection between the BS 104 and the PCF 106 for packet data services.

The PCF 106 is coupled to a PDSN 108 through an A10 interface 114 and an A11 interface 116. The A10 interface 114 provides a path for user traffic between the PCF 106 and the PDSN 108 for packet data services. The A11 interface 116 provides a signaling connection between the PCF 106 and the PDSN 108 for packet data services. The MSC 118 is coupled to the BS 104 through an A1 interface 120, an A2 interface 122 and an A5 interface 124. The A1 interface 120 carries signaling information between the call control and mobility management function (not shown) of the MSC 118 and the call control components of the BS 104. The A2 interface carries 64/56 kbps PCM information or 64 kbps Unrestricted Digital Information (UDI, for ISDN) between the Switch component (not shown) of the MSC and the Selection/Distribution Unit (not shown) function of the BS 104. The A5 interface carries a full duplex stream of bytes between the MSC 118 and the SDU function (not shown) of the BS 104. The BS 104 communicates with a wireless device 102 over an air interface. The MSC 118, BS 104, and PCF 106 are collectively referred to as a radio access network (RAN).

It will be understood by one of ordinary skill in the art that the wireless device 102 may be a radiotelephone, Internet appliance, laptop computer, or other suitable communication device. For purposes of illustration and not limitation, the wireless device 102 is hereinafter referred to as a MS in FIG. 2 and the remainder of the description.

When a packet data session associated with a MS 102 is in the Dormant state, the MS 102 may request reconnection of a packet data service instance by including a SYNC_ID previously assigned by the BS 104 for a stored service configuration, and one or more service options with the corresponding SR_ID field(s) set to "1-6" in an Origination, Enhanced Origination, Page Response, or Reconnect message with the Data Ready to Send (DRS) bit set to "1." In an alternate embodiment, the MS 102 may request reactivation of all service instances supported by the stored service configuration by sending an Origination, Enhanced Origination, Page Response, or Reconnect message to the BS 104 with the SR_ID field set to "111." The BS proceeds to reactivate all of the MS's dormant service instances supported by the stored service configuration. As applied to all embodiments, when the packet data session is dormant, the BS does not have the stored service configuration information necessary to reactivate the MS's dormant service instances. The method described in the flow diagram of FIG. 2 can be used to reactivate the MS's service instances using a stored service configuration when the packet data session is dormant.

Figure 2:
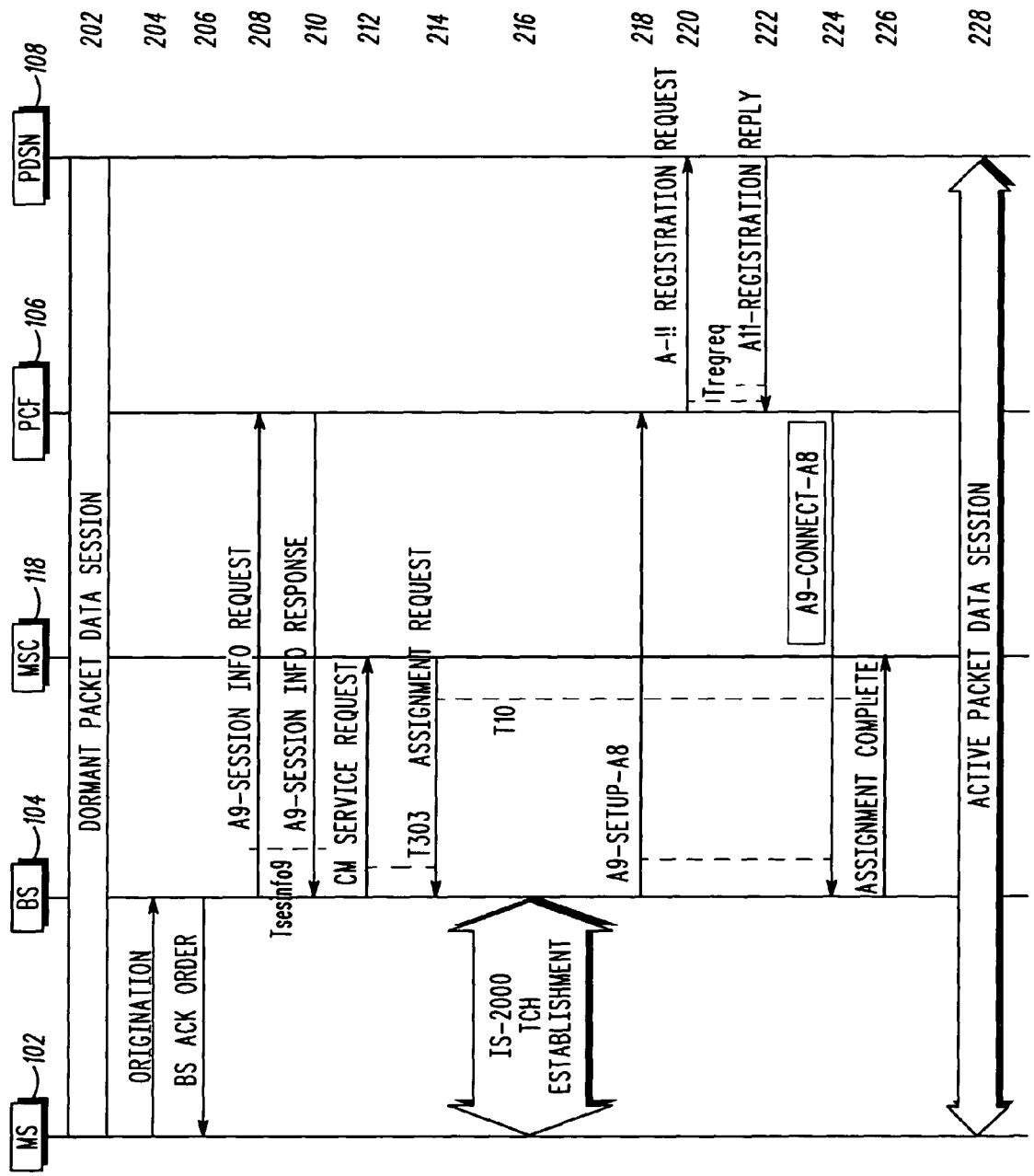
FIG. 2 is a flow diagram of the preferred embodiment of the method of supporting reactivation of a dormant session using stored service configurations.

The invention as described in FIG. 2 runs in the BS 104 and PCF 106 on any microprocessor or computer as commonly known in the art. A BS 104 that can be used with the invention is available from Motorola, Inc. headquartered in Schaumburg, Ill. A PCF 106 that can be used with the present invention is available from Hitachi, Ltd. headquartered in Japan. Referring to FIG. 2, at step 202, the packet data session is in a dormant state with all service instances currently dormant. Prior to the session going dormant, the MS initiated a packet call origination to the BS 104. The BS 104 assigned a SYNC_ID corresponding to the current service configuration and sent the SYNC_ID to the MS 102. The BS 104 also sent the SYNC_ID and corresponding service configuration information to the PCF 106 for storage. At step 204, the MS 102 sends an Origination message to the BS 104 requesting reactivation of one, some, or all of its dormant service instances. The Origination message includes the SYNC_ID previously assigned by the BS 104. It should be noted that the MS 102 may send a Reconnect message, in lieu of an Origination message at step 204. At step 206, the BS 104 acknowledges receipt of the Origination message by sending a Base Station Acknowledgment Order to the MS 102. At step 208, the BS 104 sends an A9-Session Info Request message to the PCF 106. The message includes the SYNC_ID sent by the mobile and requests the stored service configuration information corresponding to the SYNC_ID for the packet data session. Next, the BS 104 starts a timer $T_{sesinfo9}$. If timer $T_{sesinfo9}$ expires before the BS 104 receives the MS's stored service configuration information, the BS 104 may resend the A9-Session Info Request message to the PCF 106 and restart the timer a configurable number of times. If the A9-Session Info Response message is not received from the PCF 106, the stored service configuration information request is considered failed. If the information request was initiated in response to a MS initiated packet data session reactivation request from the MS 102, the session reactivation procedure is considered to have failed.

Assuming that timer $T_{sesinfo9}$ does not expire, at step 210, the PCF 106 responds to the BS 104 with an A9-Session Info Response message. The A9-Session Info Response message includes the MS's stored service configuration information requested by the BS 104. However, if the PCF 106 fails to recognize the packet data session the BS 104 is requesting information about or the packet data session does not exist, the PCF 106 preferably responds with an A9-Session Info Response message with a cause value indicating the failure.

The BS 104 stops timer $T_{sesinfo9}$ upon receipt of the A9-Session Info Response message from the PCF 106.

Next, the BS 104 constructs a CM Service Request message, places it in the Complete Layer 3 Information message (described in Section 3.1.1 of IS-2001.4-B), sends the message to the MSC 118, and starts timer $T_{303}$ (step 212). At step 214, the MSC 118 sends an Assignment Request message to the BS 104 to request assignment of radio resources. Next, the MSC 118 starts timer $T_{10}$. A terrestrial circuit between the MSC 118 and the BS 104 is not setup for the packet data call. The BS 104 stops timer $T_{303}$. At step 216, the BS 104 and the MS 102 initiate procedures to establish a radio traffic channel. In particular, the BS 104 uses the stored service configuration associated with the SYNC_ID to reactivate the packet data session. The BS 104 sends an ECAM message to the MS 102 with granted mode set to 11 thereby bypassing service negotiation. At step 218, the BS 104 transmits an A9-Setup-A8 message to the PCF 106 with the Data Ready Indicator set to "1" to establish an A8 connection and starts timer $T_{A8\text{-}setup}$. The BS 104 repeats this step for each of the service instances supported by the MS's packet data session if multiple packet data service instances are to be reactivated. Alternatively, one message may be sent to establish A8 connections for all of the reactivated service instances. The message includes the SR_ID(s) and corresponding service options for each service instance. At step 220, the PCF 106 sends an A11-Registration Request message to the PDSN 108 with a non-zero lifetime setting and accounting data for the call. The PCF 106 starts timer Treqreq. The PCF 106 repeats this step for each of the service instances supported by the MS's packet data session. Alternatively, one message may to sent to communicate accounting data for all of the reactivated service instances. At step 222, the A11-Registration Request message is validated and the PDSN 108 accepts the connection by returning an A11-Registration Reply message with an accept indication and the Lifetime set to the configured $T_{rp}$ value. Both the PDSN 108 and the PCF 106 create a binding record for the A10 connection. The PCF 106 stops timer $T_{regreq}$. The PCF 106 and PDSN 108 start timer $T_{rp}$ (not shown).

Next, at step 224, the PCF 106 establishes an A8 bearer connection and transmits an A9-Connect-A8 message with a cause value set to "Successful Operation." The BS stops the timer $T_{8A\text{-}setup}$. The PCF 106 repeats this step for each of the connections accepted by the PDSN 108. Alternatively, the PCF 106 may establish all A8 bearer connections and send one A9-Connect-A8 message indicating successful operation. At step 226, the BS 104 transmits an Assignment Complete message to the MSC 118. The MSC 118 stops timer $T_{10}$. Step 226 may occur at any time after radio link establishment (step 216). At step 228, the packet data session transitions to the Active state upon successful activation of the first service instance. All previously dormant service instances are now active.

The method of the present invention increases the speed of dormant reactivations of packet data calls supporting multiple service instances. The proposed method is efficient and requires minimal signaling over the air to complete. While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modification, equivalents and alternatives falling within the invention as defined by the following appended claims. For example, any modifications to the naming convention for messages shown in FIG. 2, where the messages provide substantially the same function, are covered by the invention.

What is claimed is:

1. A method of supporting reactivation of a dormant packet data session comprising:
   a base station receiving an identifier corresponding to stored service configuration information from a mobile station with a dormant packet data session;
   the base station requesting stored service configuration information from a packet control function, wherein the request comprises the identifier corresponding to the stored service configuration information received from the mobile station;
   the base station receiving a first message from the packet control function, the message containing stored service configuration information comprising at least one of a service option and a service reference identifier; and
   the base station reactivating the dormant packet data session using the stored service configuration information and sending a second message containing an indication to notify a mobile station to use its stored service configuration.

2. The method of claim 1 wherein before receiving an identifier corresponding to stored service configuration information from a mobile station, the method comprises
   assigning an identifier corresponding to a current service configuration of the mobile station for the session; and
   sending the identifier and the corresponding current service configuration to a packet control function.

3. The method of claim 1 wherein the at least one of a service option and a service reference identifier is associated with each service instance in a mobile station's packet data session that reactivation is requested for.

4. The method of claim 1 further comprising:
   sending a message to the packet control function to establish an A8 connection for each service instance in a mobile station's packet data session that reactivation is requested for; and
   receiving an indication that an A8 connection for each service instance that reactivation is requested for has been successfully established.

5. A method of supporting reactivation of a dormant packet data session comprising:
   receiving an identifier corresponding to a current service configuration of a mobile station for the session, the service configuration comprising at least one of a service option and a service reference identifier;
   storing the identifier and the corresponding service configuration;
   receiving a request for stored service configuration information from a base station, wherein the request comprises the identifier; and
   sending the stored service configuration corresponding to the identifier to the base station.

6. The method of claim 5 wherein the at least one of a service option and a service reference identifier is associated with each service instance in the packet data session that reactivation is requested for.

7. The method of claim 5 further comprising receiving a message requesting establishment of an A8 connection for each service instance in the packet data session that reactivation is requested for; and
   sending an indication that an A8 connection for each service instance that reactivation is requested for has been successfully established.

* * * * *